United States Patent
De et al.

(10) Patent No.: US 9,418,348 B2
(45) Date of Patent: Aug. 16, 2016

(54) AUTOMATIC TASK ASSIGNMENT SYSTEM

(71) Applicant: Oracle International Corporation, Redwoods Shores, CA (US)

(72) Inventors: Niladri De, Hyderabad (IN); Srinivasu Dudala, Hyderabad (IN); Mani Kumar Vran Kasibhatla, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 166 days.

(21) Appl. No.: 14/269,300

(22) Filed: May 5, 2014

(65) Prior Publication Data
US 2015/0317595 A1    Nov. 5, 2015

(51) Int. Cl.
G06F 9/46      (2006.01)
G06Q 10/06    (2012.01)
G06F 9/48      (2006.01)

(52) U.S. Cl.
CPC .............. *G06Q 10/06* (2013.01); *G06F 9/4843* (2013.01); *G06F 9/4881* (2013.01); *G06F 9/4887* (2013.01); *G06Q 10/063114* (2013.01)

(58) Field of Classification Search
CPC ........... G06Q 10/06; G06Q 10/063114; G06F 9/4881; G06F 9/4843; G06F 9/4887
See application file for complete search history.

(56) References Cited

U.S. PATENT DOCUMENTS

| | | |
|---|---|---|
| 5,737,728 A | 4/1998 | Sisley et al. |
| 5,745,110 A | 4/1998 | Ertemalp |
| 6,211,856 B1 | 4/2001 | Choi et al. |
| 6,707,903 B2 | 3/2004 | Burok et al. |
| 6,920,632 B2 | 7/2005 | Donovan et al. |
| 7,092,929 B1 | 8/2006 | Dvorak et al. |
| 7,406,432 B1 | 7/2008 | Motoyama |
| 7,536,313 B2 | 5/2009 | Motoyama |
| 7,688,322 B2 | 3/2010 | Kapler et al. |
| 7,912,746 B2 | 3/2011 | Kline et al. |
| 7,921,026 B2 | 4/2011 | O'Cull et al. |
| 7,930,339 B2 * | 4/2011 | Tobita .................. G06F 9/4887 709/202 |
| 8,099,312 B2 | 1/2012 | Jin et al. |
| 8,160,911 B2 | 4/2012 | Lau et al. |
| 8,286,103 B2 | 10/2012 | Chaudhri et al. |
| 8,433,632 B2 | 4/2013 | Sankaran et al. |

(Continued)

FOREIGN PATENT DOCUMENTS

| | | |
|---|---|---|
| EP | 1026609 A2 | 8/2000 |
| WO | 9416397 | 7/1994 |

(Continued)

OTHER PUBLICATIONS

Burchard et al. "New Strategies for Assigning Real-Time Tasks to Multiprocessor Systems", 1995 IEEE, pp. 1429-1442.*

(Continued)

*Primary Examiner* — Van Nguyen
(74) *Attorney, Agent, or Firm* — Miles & Stockbridge P.C.

(57) ABSTRACT

A system is provided that automatically assigns tasks to resources. The system receives a notification that a resource is about to enter an idle period or has entered the idle period. The system further automatically assigns a filler task or a portion of the filler task to the resource, where the filler task is a task that can be split into multiple portions. The system further receives a notification that the resource is about to exit the idle period or has exited the idle period. The system further automatically un-assigns the filler task or the portion of the filler task from the resource.

20 Claims, 8 Drawing Sheets

(56) References Cited

U.S. PATENT DOCUMENTS

| | | | |
|---|---|---|---|
| 8,544,011 B2 | 9/2013 | Tanikawa | |
| 8,776,008 B2 | 7/2014 | Kapoor et al. | |
| 8,793,697 B2* | 7/2014 | Gargash | G06F 1/329 718/100 |
| 9,015,723 B2* | 4/2015 | Gilat | G06F 9/4881 718/104 |
| 2003/0038831 A1 | 2/2003 | Engelfriet | |
| 2003/0061266 A1 | 3/2003 | Ouchi | |
| 2005/0149370 A1 | 7/2005 | Brown | |
| 2005/0165631 A1 | 7/2005 | Horvitz | |
| 2005/0198103 A1 | 9/2005 | Ching | |
| 2006/0004618 A1 | 1/2006 | Brixius | |
| 2006/0059488 A1* | 3/2006 | Lin | G11B 27/36 718/100 |
| 2007/0073575 A1 | 3/2007 | Yomogida | |
| 2007/0150327 A1 | 6/2007 | Dromgold | |
| 2007/0233534 A1 | 10/2007 | Martin et al. | |
| 2007/0245300 A1 | 10/2007 | Chan et al. | |
| 2008/0103871 A1 | 5/2008 | Ruehl et al. | |
| 2008/0126114 A1 | 5/2008 | McClure | |
| 2008/0155433 A1 | 6/2008 | Robertson et al. | |
| 2008/0221946 A1 | 9/2008 | Balon | |
| 2009/0133027 A1 | 5/2009 | Gunning et al. | |
| 2009/0198540 A1 | 8/2009 | Kienzle et al. | |
| 2009/0234699 A1 | 9/2009 | Steinglass et al. | |
| 2010/0010856 A1 | 1/2010 | Chua et al. | |
| 2011/0107256 A1 | 5/2011 | Robertson et al. | |
| 2011/0271220 A1 | 11/2011 | Remsberg et al. | |
| 2011/0283285 A1 | 11/2011 | Saad et al. | |
| 2012/0130907 A1 | 5/2012 | Thompson et al. | |
| 2012/0278118 A1 | 11/2012 | Araki et al. | |
| 2013/0144679 A1 | 6/2013 | Burnett et al. | |
| 2013/0227583 A1* | 8/2013 | Gargash | G06F 1/329 718/104 |
| 2013/0263148 A1* | 10/2013 | Brueggen | G06F 9/5016 718/104 |
| 2013/0305258 A1* | 11/2013 | Durant | G06F 9/4881 718/106 |
| 2014/0244334 A1 | 8/2014 | De et al. | |

FOREIGN PATENT DOCUMENTS

| | | | |
|---|---|---|---|
| WO | 0118683 | A2 | 3/2001 |
| WO | 20040102431 | A1 | 11/2004 |
| WO | 2009055425 | A1 | 4/2009 |
| WO | 2012092556 | A2 | 7/2012 |
| WO | 20130100902 | A1 | 7/2013 |
| WO | 20130162572 | A1 | 10/2013 |

OTHER PUBLICATIONS

YangRui et al. "An Algorithm for Assigning Tasks in Parallel Computing", 2010 IEEE, pp. 360-363.*

Carlson "Better Schedules—Automatically", 1968 IEEE, pp. 188-192.*

Daniel D. Suthers, "An Analysis of Explanation and Its Implications for the Design of Explanation Planners", Computer Science, Feb. 1993, ftp://ftp.pitt.edu/dept/lrdc/edtech/suthers/suthers-thesis-full.pdf, last downloaded Mar. 5, 2014.

Charlotte Russe, "Board delivers Budgeting and Planning Applications for Charlotte Russe", http://www.board.com/downloads/1en_CharlotteRusse.pdf, last downloaded Mar. 5, 2014.

Constraints and Dependencies—Gantt Charts Online—Gantto.com, http://gantto.com/support/documentation constraints-and-dependencies/?overlay=false, last downloaded Mar. 5, 2014.

Stephen Sloan et al., "CPM and Gantt: The Next Step in Multi-Project Management", http://www.nesug.org/Proceedings/nesug12/ma/ma07.pdf, last downloaded Mar. 5, 2014.

Distribute project work evenly (level resource assignments), http://office.microsoft.com/en-in/project-help/distribute-project-work-evenly-level-resource-assignments-HA001231647.aspx, last downloaded Mar. 5, 2014.

Agata Czarnigowska, "Earned value method as a tool for project control", Budownictwo i Architektura 3 (2008) 15-32, http://yadda.icm.edu.pl/baztech/element/bwmeta1.element.baztech-article-BPL6-0014-0070/c/httpwibis_pollub_plfilesplikikonferencje32.pdf, last downloaded Mar. 5, 2014.

Bonnie Biafore, "Fast-track tasks to shorten your project schedule—Project—Office.com", http://office.microsoft.com/en-in/project-help/fast-track-tasks-to-shorten-your-project-schedule-HA010036399.aspx, last downloaded Mar. 5, 2014.

Features: Task Management, Zilicus PM Project planing & collaboration software, http://www.zilicus.com/features/task-management.html, last downloaded Mar. 5, 2014.

Danny Holten, "Hierarchical Edge Bundles: Visualization of Adjacency Relations in Hierarchical Data", IEEE Transactions on Visualization and Computer Graphics, vol. 12, No. 5, Sep./Oct. 2006, http://www.win.tue.nl/~dholten/papers/bundles_infovis.pdf, last downloaded Mar. 5, 2014.

How to Create Project Schedule Part II, Elementool Project Management Blog, http://www.elementool.com/blog/?p=238, last downloaded Mar. 5, 2014.

Zhenhua Guo et al., "Improving Resource Utilization in MapReduce", School of Informatics and Computing, Indiana University, US, http://grids.ucs.indiana.edu/ptliupages/publications/Improve_Resource_Utilization_MapReduce_V8.pdf, last downloaded Mar. 5, 2014.

Microsoft Project—Project Management Features, http://office.microsoft.com/en-us/project/project-management-and-ppm-show-case-microsoft-project-FX103802304.aspx, last downloaded Mar. 5, 2014.

Microsoft Project—Project Portfolio Management Features, http://office.microsoft.com/en-us/project/project-management-and-ppm-showcase-microsoft-project-FX103802304.aspx, last downloaded Mar. 5, 2014.

Download Microsoft Project for the masses from Official Microsoft Download Centre, "Microsoft Project for the masses", http://www.microsoft.com/en-in/download/details.aspx?id=25194, last downloaded Mar. 5, 2014.

Project Management Software—Quick Tour, "MinuteMan Systems", http://www.minuteman-systems.com/QuickTour.htm, last downloaded Mar. 5, 2014.

Oracle Primavera, Oracle Data Sheet, "Oracle's Primavera P6 Enterprise Project Portfolio Management", Copyright 2013.

OmniPlan, version 2.0.1 Manual, http://downloads2.omnigroup.com/software/MacOSX/Manuals/OmniPlan-2-Manual.pdf, last downloaded Mar. 5, 2014.

Wolfgang Wahlster et al., "Plan-based Integration of Natural Language and Graphics Generation", Jan. 1993, http://scidok.sulb.uni-saarland.de/volltexte/2013/5011/pdf/RR_93_02_.pdf, last downloaded Mar. 5, 2014.

Top Down and Bottom Up Planning Project Management Tool Set, "PM Tool with Top Down Planning Design and Bottom Up Processing Strategic Approach", http://2-plan.com/free-project-management-software-2-plan-desktop/top-down-and-bottom-up-planning-project-management-tool-set.html, last downloaded Mar. 5, 2014.

Project Management Shortcuts: Resource Leveling Made Easy—Liquid Planner, http://www.liquidplanner.com/blog/project-management-shortcuts-resource-leveling-made-easy/, last downloaded Mar. 5, 2014.

RationalPlan Project Management Software—MultiProject Version, http://www.rationalplan.com/multi-project-management-software.php, last downloaded Mar. 5, 2014.

Scheduling Projects Reference 1, http://www.openxprocess.com/help/reference/scheduler/overview.html, last downloaded Mar. 5, 2014.

Scheduling Projects Reference 2, http://www.openxprocess.com/help/reference/scheduler/specify_tasks.html, last downloaded Mar. 5, 2014.

Andy Carmichael, Ph.D., CEng, FBCS, "Planning by Priority, How to prioritize project tasks to maximize delivered business benefits", Ivis Technologies, Issue 2.0, Scheduling Projects Reference 3, http://www.openxprocess.com/whitepapers/Planning%20By%20Priority%20_04_.pdf, last downloaded Mar. 5, 2014.

(56) References Cited

OTHER PUBLICATIONS

Asana Guide, The path to doing great things, "Sorting & Filtering", https://asana.com/guide/projects/sorting, last downloaded Mar. 5, 2014.
TaskInsight 3.0 Task Manager Updates Timeline Graphics and Functionality, http://prmac.com/release-id-29274.htm, last downloaded Mar. 5, 2014.
Anant Shree Agrawal, "Task Prioritization Rules for Project Execution", (IJERA) ISSN: 2248-9622, vol. 2, Issue 4, Jul.-Aug. 2012, pp. 1208-1212, http://www.ijera.com/papers/Vol2_issue4/GT2412081212.pdf, last downloaded Mar. 5, 2014.
Time Management Software—Get Things Done with Achieve Planner Task Management, http://www.effexis.com/achieve/planner.htm, last downloaded Mar. 5, 2014.
Use top-down planning to create summary tasks (or phases)—Project—Office.com, http://office.microsoft.com/en-in/project-help/use-top-down-planning-to-create-summary-tasks-or-phases-HA010376809.aspx, last downloaded Mar. 5, 2014.
VMware Horizon Mirage Web Manager Guide, v4.2, Jun. 2013, http://www.vmware.com/pdf/mirage-web-manager-guide-42.pdf, last downloaded Mar. 5, 2014.
What is Project Management—Lean Kit, http://leankit.com/project-management/what-is-project-management/, last downloaded Mar. 5, 2014.
Workforce Scheduler, Employee Scheduling Software Saves Time and Money and Gets People Working, by Kronos www.kronos.com/Scheduling-Software/Employee-Scheduling-Software.aspx, last downloaded Mar. 5, 2014.
Niladri De et al., U.S. Appl. No. 14/200,057, filed Mar. 7, 2014.
Niladri De et al., U.S. Appl. No. 14/200,054, filed Mar. 7, 2014.
Ragnar Bade et al., "Connecting time-oriented data and informatin to a coherent interactive visualization", Proceedings of the 2004 Conference on Human Factors in Computing Systems, CHI '04, Jan. 1, 2004, pp. 105-112, XP055138586.
Oracle, "Oracle RCUI Guidelines", Oracle ADF Rich Client User Interface Guidelines, Gantt Chart Usage Guideline, http://www.oracle.com/webfolder/ux/middleware/richclient/index.html?/webfolder/ux/middleware/richclient/guidelines5/gantt.html, last downloaded Jan. 15, 2015.
Opinion Center Li, "Microsoft Project", http://opinioncenterli/microsoft-project!, last downloaded Jan. 15, 2015.
Seavus Project Viewer, "User Manual for Seavus Project Viewer 11", http://www.seavusprojectviewer.com/support/documents!, last visited on Jan. 22, 2015, 118 pages.

\* cited by examiner

AUTOMATIC TASK ASSIGNMENT SYSTEM

FIELD

One embodiment is directed to a computer system, and more particularly, to a computer system that displays data.

BACKGROUND

In project planning, tasks are usually planned to keep all resources (such as human resources or mechanical resources) fully utilized, meaning that the resources have minimal or no idle periods. However, the following situations commonly arise during the execution of a project: (1) a task gets blocked because of outside factors, rendering a resource idle; (2) a task gets delayed, resulting in blockage of a successor dependent task, and resulting in a resource for the dependent task becoming idle; (3) a resource finishes its task early, but is not able to start the next task because of a dependency or constraint, resulting in the resource becoming idle; or (4) a resource has an idle period which could not be fulfilled at planning time. On the other hand, in almost every project in every industry or domain, there are tasks which have the following attributes: (1) low priority; (2) capable of being started and stopped multiple times; (3) high time-flexibility; (4) generic (i.e., not requiring a specific skill); and (5) capable of being done by more than one resource in parallel.

SUMMARY

One embodiment is a system that automatically assigns tasks to resources. The system receives a notification that a resource is about to enter an idle period or has entered the idle period. The system further automatically assigns a filler task or a portion of the filler task to the resource, where the filler task is a task that can be split into multiple portions. The system further receives a notification that the resource is about to exit the idle period or has exited the idle period. The system further automatically un-assigns the filler task or a remaining portion of the filler task from the resource.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, an automatic task assignment system is provided. The automatic task assignment system can automatically assign a portion of (or an entire) filler task to a resource that becomes idle, during the length of an idle period of the resource, in response to a notification received by the automatic task assignment system indicating that the resource has become idle. A "filler task" is a task that is identified as being capable of being split into multiple portions. Further, a "filler task" can, optionally, be a task that is also identified as: (1) having a low priority; (2) having a high time-flexibility; and (3) being capable of being started and stopped multiple times. The automatic task assignment system can also automatically un-assign an unfinished portion of the filler task in response to a notification received by the automatic task assignment system indicating an end of the idle period of the resource. By "automatically" assigning or un-assigning filler tasks to resources, the automatic task assignment system can assign or un-assign filler tasks to resources without any interaction from a user of the automatic task assignment system, such as a project manager, a resource, or a resource owner. The automatic task assignment system can further display available filler tasks within a task management user interface, where the filler tasks are differentiated from scheduled tasks by displaying the filler tasks in a designated region of the task management user interface. The automatic task assignment system can further allow the conversion of a scheduled task into a filler task, and vice versa. The automatic task assignment system can also optionally take into consideration a maximum parallelism level of the filler task (i.e., a maximum number of resources that can work on the filler task in parallel) in assigning filler tasks to resources.

Figure 1:
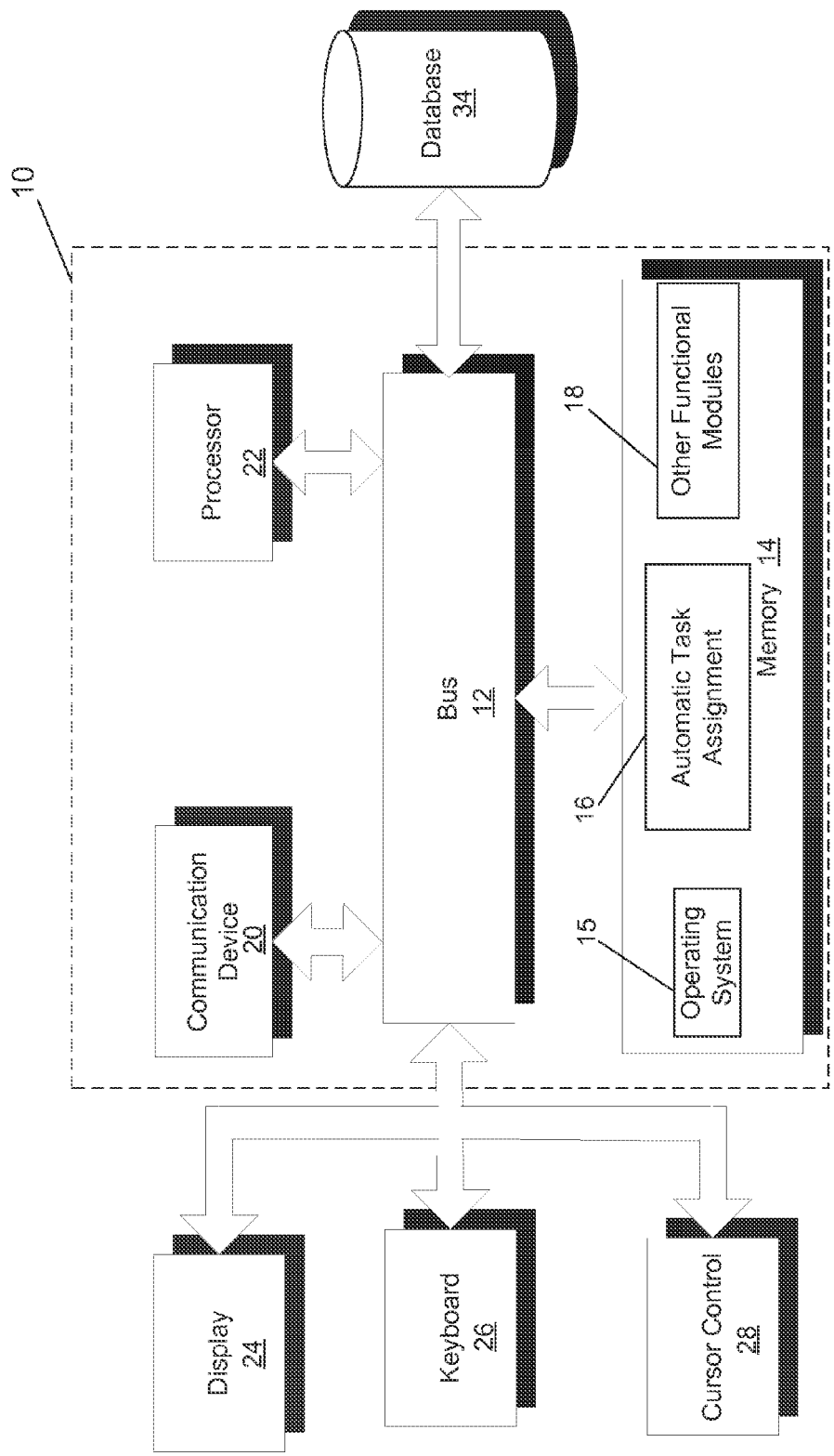
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, an automatic task assignment module 16, as well as other functional modules 18. Operating system 15 can provide an operating system functionality for system 10. Automatic task assignment module 16 can provide functionality for automatically assigning tasks to resources, as further disclosed below. In certain embodiments, automatic task assignment module 16 can comprise a plurality of modules, where each module provides specific individual functionality for automatically assigning tasks to resources. System 10 can also be part of a larger system. Thus, system 10 can include one or more additional functional modules 18 to include the additional functionality. For example, functional modules 18 may include modules that provide additional functionality, such as functionality of a "Primavera Enterprise Project Portfolio Management" by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, while tasks are usually scheduled to keep all resources fully utilized, situations can arise that render a resource idle. In these situations, there can be a need for assigning some other task to the idle resource to utilize the idle period. Also, implicitly, there can be a need for un-assigning the "other" task from the resource when a regularly scheduled task can be resumed. Further, as also previously described, there are tasks which are low-priority, capable of being started and stopped multiple times, and have high time-flexibility. There can also be a need to demarcate these tasks, because they can be utilized for fulfilling otherwise un-utilized time for resources.

Currently, in relevant industries, when a resource becomes idle, one of the following actions can happen. A project manager can intervene to manually assign a different task to the resource, and can manually un-assign the different task from the resource when a regularly planned task is ready to resume. Alternatively, a resource itself, or a resource owner (such as a machine operator, when the resource is a machine) can manually select a different task to work on. However, these options are ad-hoc, manual, and rely heavily on the efficiency and effectiveness of the project manager, resource, or resource owner, for their success. Further, if scenarios where resources become idle arise frequently, this requires the project manager, resource, or resource owner to intervene frequently to make manual adjustments. The process can become laborious, error-prone, and almost humanly impossible for a large and complex project with frequent resource idle periods.

As an alternative action in response to a resource becoming idle, an automated scheduling process can be re-executed with updated data regarding the progress of all tasks to manipulate dates and/or resource assignments of all remaining incomplete or non-started tasks, so that the idle resource is assigned a new task. However, re-executing the automated scheduling process can potentially modify dates and resource assignments of a large number of tasks to solve a small and localized problem, such as a delay, early finish, or blockage of a single task. In other words, the action can create a significant disruption in the entire project plan in order to solve a small problem. Further, an automated scheduling process usually does not recognize whether a task can be split, and usually tries to schedule all the tasks in their entirety. As a result, after modifying dates and resource assignments for a large number of tasks, and creating a significant disruption in the project plan, the project plan may still have idle slots for resources. Alternatively, if the automated scheduling process is capable of splitting a task, it usually is not capable of recognizing whether splitting the task will decrease the efficiency of the task. As a result, the automated scheduling process can potentially split every task, irrespective of whether it is desirable to split the task, and whether splitting the task will reduce the efficiency of the project plan.

In light of the potential side effects associated with modifying dates and resource assignments, there is a need for an automatic task assignment system to automatically make localized adjustments to a project plan whenever a resource is about to enter into an idle period or has already entered an idle period. In addition, when a resource is able to start an earlier-planned task, there is also a need for the automatic task assignment system to automatically make "reverse" adjustments, as necessary.

According to an embodiment, an automatic task assignment system can utilize an event-based mechanism to automatically select filler tasks, automatically assign selected filler tasks to idle resources, un-assign the selected filler tasks from resources that are no longer idle, and re-assign pre-defined scheduled tasks to the resources that are no longer idle. As described below in greater detail, the event-based mechanism can involve the detection of start-trigger conditions and stop-trigger conditions. Upon detection of either a start-trigger condition or a stop-trigger condition, an event notification can be sent to the automatic task assignment system. In response to receiving the event notification, the automatic task assignment system can automatically assign a filler task to a resource, or automatically un-assign a filler task from a resource. The automatic task assignment system can subsequently send a message to a project manager, a resource, a resource manager, or a combination therein, where the message indicates that a filler task is either being assigned to the resource or un-assigned from the resource. The message can take the form of an automated e-mail message, automated text message, or some other sort of electronic message that can be automatically sent by the automatic task assignment system.

As previously described, a filler task is a task that is identified as being capable of being split into multiple portions. Further, a filler task is typically a task that is identified as having a low priority, having a high time-flexibility, and being capable of being started and stopped multiple times. Thus, a filler task is a task that is not identified as a critical task. A filler task can also be identified as a low-priority multi-start-stop-able time-flexible task ("LMTT"). In a construction industry, an example of a filler task is a task of laying out concrete slabs, because this is a task that can be split into multiple portions, and can be performed incrementally by multiple resources.

Initially, according to an embodiment, the automatic task assignment system can assist a user in defining one or more tasks of a project plan as filler tasks. Based on one or more pre-defined thresholds, the automatic task assignment system can identify one or more tasks as potential filler tasks, and suggest to the user that the suggested task be defined as filler task. Examples of pre-defined thresholds can include a priority threshold that can be used to determine whether a task has a low priority, and can also include a time-flexibility threshold that can be used to determine whether a task has a high time-flexibility (i.e., whether a task has a high float time, or difference between an earliest date and/or time and a latest date and/or time when a task can be scheduled to start or finish). A user can either accept or reject a suggestion by the automatic task assignment system. If the user accepts the suggestion, the suggested task is defined as a filler task. A user can also manually define any task to be either a filler task or a scheduled task. A scheduled task is a task that is scheduled for a specific time and/or date. In contrast, a filler task is not scheduled for a specific time and/or date.

In certain embodiments, one or more system configuration parameters can optionally be made available to the user for fine tuning the thresholds used to identify tasks as potential filler tasks. The user can then configure the system configuration parameters based on user preferences. For example, a user can configure a priority threshold, where any task with a priority greater than or equal to the priority threshold is not suggested as a potential filler task by the system. As another example, a user can configure a time-flexibility threshold, where any task with a time-flexibility less than or equal to the time-flexibility threshold is not suggested as a potential filler task by the system.

Once all the tasks of a project plan have either been defined as a filler task or a scheduled task, the automatic task assignment system can visually display the filler tasks, scheduled tasks, and project plan within a user interface. The automatic task assignment system can display all filler tasks within a region (identified as a "filler tasks region") that is separate from a region that includes the project plan and the scheduled tasks. In some embodiments, a user can scroll along a time axis within the region that includes the project plan, and the display of the filler tasks region can remain fixed within the user interface while the user scrolls. According to an embodiment, the scheduled tasks can be displayed with the project plan based on their scheduled dates and/or times. In contrast, because the filler tasks are not scheduled on any specific date and/or times, the filler tasks can be displayed within the filler task region rather than the region that includes the project plan, where the filler tasks can be displayed in a sorted order based on the priority of the filler tasks (e.g., filler tasks with higher priority can be displayed higher within the filler tasks region, and filler tasks with lower priority can be displayed lower within the filler tasks region). In certain embodiments, a duration (or effort) of a filler task can also be displayed within the user interface. Further, in certain embodiments, a filler task can include: a parallelism level (i.e., a maximum number of resources that the filler task can be assigned to in parallel), a minimum split duration (i.e., a condition that the filler task cannot be split into a portion whose duration is smaller than a minimum split duration), a skill matching requirement, or an intrinsic dependency and/or constraint. In these embodiments, the parallelism level, minimum split duration, skill matching requirement, or intrinsic dependency and/or constraint can also be displayed within the user interface. In alternate embodiments, filler tasks may not be displayed within the user interface at all, except when the filler tasks are assigned to idle resources, either in part or as a whole.

According to an embodiment, if a scheduled task that is displayed within the project plan is subsequently defined as a filler task, the newly-defined filler task can be removed from the project plan and displayed within the filler tasks region. Similarly, if a filler task that is displayed within a filler tasks region subsequently gets defined as a scheduled task, the newly-defined scheduled task can be removed from the filler tasks region and displayed within the project plan.

In accordance with an embodiment, the automatic task assignment system can determine that a resource is about to enter an idle period (i.e., a period of time where no tasks are assigned to the resource), or has entered an idle period. The phrase "about to" refers to a scenario where a resource has not yet entered an idle period, but will enter an idle period after a duration that is within a pre-defined threshold (such as within 5 seconds, within 2 hours, or some other duration). In an embodiment, the automatic task assignment system can determine that a resource is about to enter an idle period, or has entered an idle period, by receiving a notification event that is triggered in response to a detection of a start-trigger condition. A "start-trigger condition" is a condition that defines a start of an idle period for a resource. Examples of start-trigger conditions include, but are not limited to: (a) a resource's current task becoming blocked; (b) a resource being scheduled to start on a successor task that is blocked; (c) a resource finishing a scheduled task early, and not being able to start a successor scheduled task; or (d) a resource entering a planned idle period, or being about to enter a planned idle period. Such example start-trigger conditions are further described in greater detail in conjunction with FIGS. 2-7.

Once the automatic task assignment system determines that a resource is about to enter an idle period, or has entered an idle period, the automatic task assignment system can fill the idle period (or at least a portion of the idle period) by automatically assigning a filler task, or a portion of the filler task, to the resource. When there are one or more filler tasks that can be assigned to the resource at that time, the automatic task assignment system can select a filler task from the one or more filler tasks and assign the selected filler task to the resource. In an embodiment, the automatic task assignment system can consider one or more of the following factors in selecting a filler task from the one or more tasks: (a) relative priority between filler tasks (e.g., filler task with highest priority is assigned first); (b) intrinsic dependency and/or constraint for a filler task (if specified) must be satisfied; (c) parallelism level of a filler task (if specified) must be satisfied (i.e., filler task should not be assigned to a number of resources in parallel that exceeds parallelism level); (d) minimum split duration of a filler task (if specified) must be satisfied (i.e., filler task should not be split into portions with durations less than minimum split duration); or (e) skill matching requirement (if specified) must be satisfied. Example filler task assignments are further described below in greater detail in conjunction with FIGS. 2-7.

Further, the automatic task assignment system can identify a duration of the idle period. If a duration of the selected filler task is less than or equal to the duration of the idle period, the automatic task assignment system can assign the entire filler task to the resource. However, if a duration of the selected filler task is greater than the duration of the idle period, the automatic task assignment system can divide the filler task into a first portion and a second portion, where a duration of the first portion of the filler task is equal to the duration of the idle period. The automatic task assignment system can then assign the first portion of the filler task to the resource.

In accordance with an embodiment, the automatic task assignment system can subsequently determine that the resource is about to exit the idle period (where the filler task is not taken into consideration when determining whether the resource is within the idle period) or has exited the idle period. In an embodiment, the automatic task assignment system can determine that a resource is about to exit an idle period, or has exited an idle period, by receiving a notification event that is triggered in response to a detection of a stop-trigger condition. A "stop-trigger condition" is a condition that defines an end of an idle period for a resource. Examples of stop-trigger conditions include, but are not limited to: (a) the resource's current scheduled task becoming unblocked; (b) the resource's successor scheduled task becoming unblocked when the resource has completed the current scheduled task; or (c) a start date and/or time for the resource's successor scheduled task being reached or about to be reached. Such example stop-trigger conditions are further described in greater detail in conjunction with FIGS. 2-7.

Once the automatic task assignment system determines that a resource is about to exit an idle period, or has exited an idle period, the automatic task assignment system can automatically un-assign the filler task, or the portion of the filler task, from the resource. If the resource did not complete the filler task, the automatic task assignment system can define a remaining portion of the filler task as an available filler task, where the automatic task assignment system can subsequently select the remaining portion of the filler task and assign it to another resource that enters or is about to enter another idle period.

Figure 2:
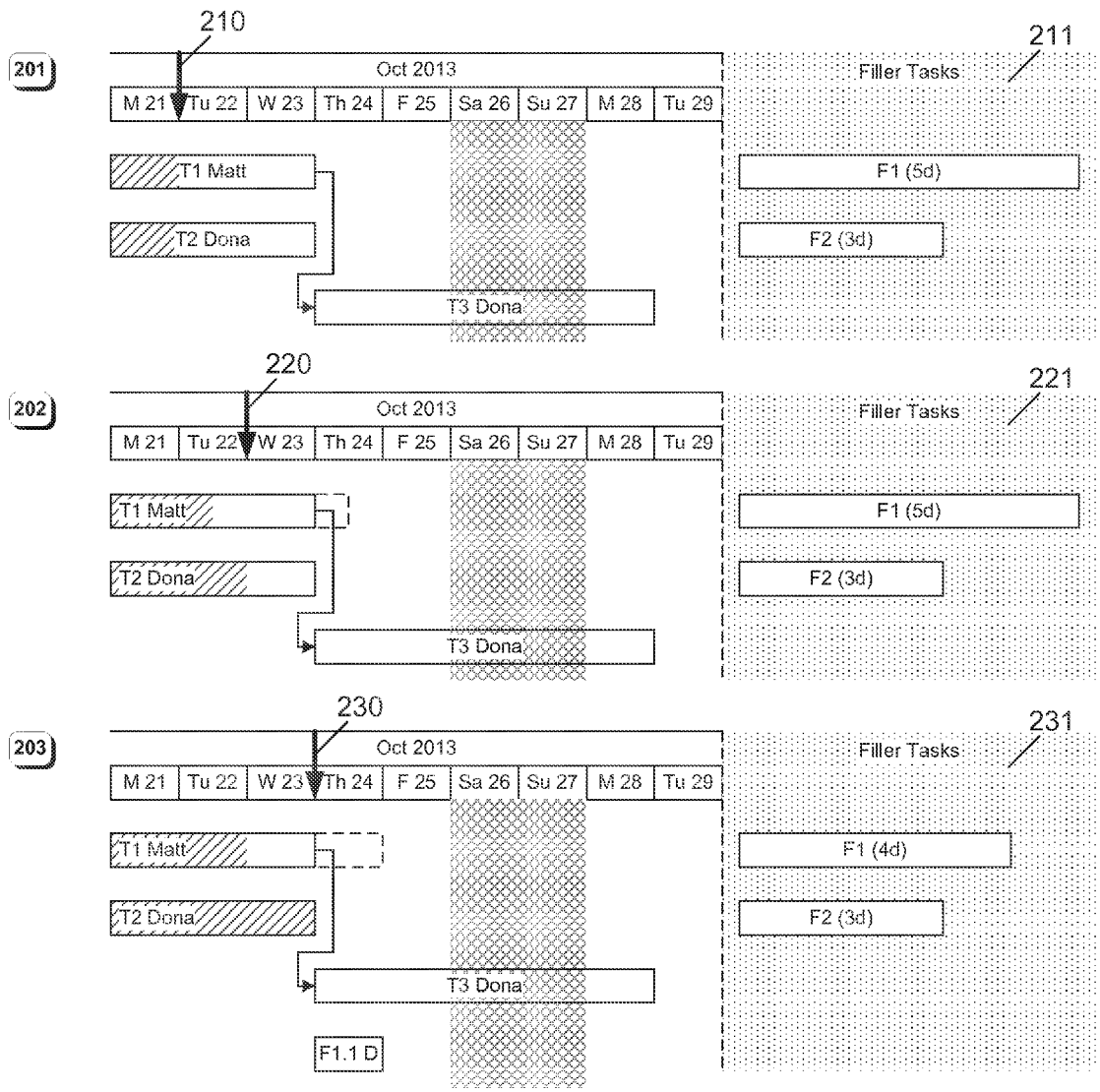
FIG. 2 illustrates an assignment of a filler task to a resource when a scheduled task is blocked due to a delay in a predecessor task, according to an embodiment of the invention.

FIG. 2 illustrates an assignment of a filler task to a resource when a scheduled task is blocked due to a delay in a predecessor task, according to an embodiment of the invention. More specifically, FIG. 2 illustrates a project plan 201 displayed by an automatic task assignment system, such as system 10 of FIG. 1. Project plan 201 includes scheduled tasks T1, T2, and T3 which are displayed within a timeline, where scheduled task T1 is assigned to resource Matt, and where scheduled tasks T2 and T3 are assigned to resource Dona. Scheduled task T3 has a finish-to-start dependency on scheduled task T1 (illustrated in project plan 201 of FIG. 2 by an arrow connecting scheduled tasks T1 and T3), where scheduled task T3 cannot be started until scheduled task T1 is finished.

Arrow 210 indicates an update received-by date of Oct. 21, 2013, where the update received-by date indicates a date by which all progress updates, or notifications, have been received by the automatic task assignment system. In other words, all progress updates, or notifications, sent on dates up to and including Oct. 21, 2013 have been received by the automatic task assignment system. The hatched portions of scheduled tasks T1 and T2 indicate completed portions of scheduled tasks T1 and T2 as of Oct. 21, 2013. Thus, for scheduled tasks T1 and T2, a portion of each scheduled task with a duration of 1 day has been completed. In other words, the completion of scheduled tasks T1 and T2 is according to schedule. Project plan 201 further includes filler tasks F1 and F2, where filler tasks F1 and F2 are displayed within a filler task region 211. Filler task F1 has a duration of 5 days, and filler task F2 has a duration of 3 days. Further, filler task F1 has a higher priority than filler task F2, and thus, filler task F1 is displayed above filler task F2 within filler task region 211.

Further, FIG. 2 illustrates project plan 202 displayed by the automatic task assignment system. Within project plan 202, arrow 220 indicates an update received-by date of Oct. 22, 2013. For scheduled task T1, a portion of the scheduled task with a duration of 1.5 days has been completed, and, for scheduled task T2, a portion of the scheduled task with a duration of 2 days has been completed. Thus, the completion of scheduled task T1 is 0.5 days behind schedule, and the completion of scheduled task T2 is according to schedule. As illustrated in project plan 202 of FIG. 2, a dashed extension rectangle at the end of scheduled task T1 indicates a new expected finish date of Oct. 24, 2013 (mid-day), which is 0.5 days after a planned finish date of Oct. 23, 2013 (end-of-day). Filler tasks F1 and F2 displayed within filler tasks region 221 are unchanged from filler tasks F1 and F2 displayed within filler task region 211 of project plan 201.

FIG. 2 also illustrates project plan 203 displayed by the automatic task assignment system. Within project plan 203, arrow 230 indicates an update received-by date of Oct. 23, 2013. For scheduled task T1, a portion of the scheduled task with a duration of 2 days has been completed, and, for scheduled task T2, the entire scheduled task has been completed. Thus, the completion of scheduled task T1 is 1 day behind schedule, and scheduled task T2 has been completed according to schedule. As illustrated in project plan 203 of FIG. 2, a dashed extension rectangle at the end of scheduled task T1 indicates a new expected finish date of Oct. 24, 2013 (end-of-day), which is 1 day after a planned finish date of Oct. 23, 2013 (end-of-day).

While Dona has completed scheduled task T2, Dona cannot start scheduled task T3 because scheduled Task T3 has a finish-to-start dependency on scheduled task T1, and Matt has been delayed in completing scheduled task T1. Thus, scheduled task T3 is blocked due to a delay in scheduled task T1, which is a predecessor task of scheduled task T3, and Dona has entered (or is about to enter) an idle period with a duration of 1 day. In response to Dona entering (or being about to enter) an idle period, the automatic task assignment system automatically detects a "start-trigger" condition, splits filler task F1 into filler task F1.1 with a duration of 1 day and filler task F1 with a duration of 4 days, and then automatically assigns filler task F1.1 to Dona. The automatic task assignment system further sends a message to Dona informing Dona of the filler task assignment. Thus, the automatic task assignment system displays filler task F1.1 within the timeline, and displays an unassigned portion of filler task F1 within filler tasks region 231. Filler task F2, which is also displayed within filler tasks region 231, is unchanged from filler task F2 displayed within filler task region 221 of project plan 202.

Figure 3:
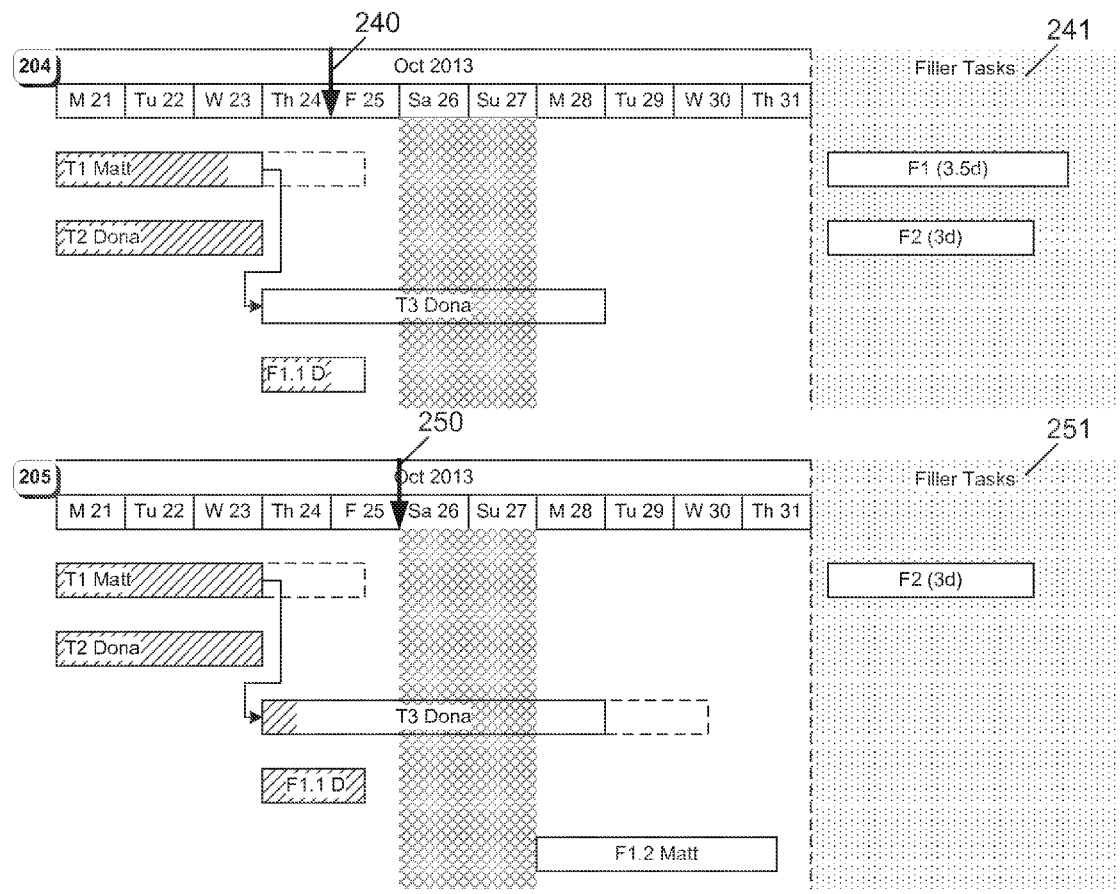
FIG. 3 illustrates an assignment of a filler task to a resource when a scheduled task is blocked due to a delay in a predecessor task, according to another embodiment of the invention.

FIG. 3 illustrates an assignment of a filler task to a resource when a scheduled task is blocked due to a delay in a predecessor task, according to another embodiment of the invention. More specifically, FIG. 3 illustrates a project plan 204 displayed by an automatic task assignment system, such as system 10 of FIG. 1. Within project plan 204, arrow 240 indicates an update received-by date of Oct. 24, 2013. For scheduled task T1, a portion of the scheduled task with a duration of 2.5 days has been completed, for scheduled task T2, the entire scheduled task has been completed, and for filler task F1.1, the entire portion of the filler task has been completed. Thus, the completion of scheduled task T1 is 1.5 days behind schedule, scheduled task T2 has been completed according to schedule, and filler task F1.1 has been completed according to schedule. As illustrated in project plan 204 of FIG. 3, a dashed extension rectangle at the end of scheduled task T1 indicates a new expected finish date of Oct. 25, 2013 (mid-day), which is 1.5 days after a planned finish date of Oct. 23, 2013 (end-of-day).

As illustrated in project plan 204 of FIG. 3, Dona has completed filler task F1.1. However, Dona still cannot start scheduled task T3 because scheduled Task T3 has a finish-to-start dependency on scheduled task T1, and Matt has continued to be delayed in completing scheduled task T1. Thus, scheduled task T3 remains blocked due to a delay in scheduled task T1, which is a predecessor task of scheduled task T3, and Dona has entered (or is about to enter) a new idle period with a duration of 0.5 days. In response to Dona entering (or being about to enter) an idle period, the automatic task assignment system automatically detects a "start-trigger" condition, splits the unassigned portion of filler task F1, with a duration of 4 days, into two portions: a first portion with a duration of 0.5 days, and the second portion with a duration of 3.5 days. The automatic task assignment system appends the first portion with a duration of 0.5 days to filler task F1.1, keeps filler task F1 with a duration of 3.5 days unassigned, and automatically assigns the appended portion of filler task F1.1 to Dona. The automatic task assignment system further sends a message to Dona informing Dona of the extended, or appended, filler task assignment. Thus, the automatic task assignment system displays extended, or appended, filler task F1.1 within the timeline, and displays the unassigned portion of filler task F1 within filler tasks region 241. Filler task F2, which is also displayed within filler tasks region 241, is unchanged from filler task F2 displayed within filler task region 231 of project plan 203.

Further, FIG. 3 illustrates project plan 205 displayed by the automatic task assignment system. As illustrated in project plan 205, Matt has completed scheduled task T1. Further, Dona has completed filler task F1.1. Because scheduled task T1 has been completed, Dona begins to work on scheduled task T3. Matt does not have any remaining assigned scheduled tasks.

Further, within project plan 205, arrow 250 indicates an update received-by date of Oct. 25, 2013. For scheduled task T1, the entire scheduled task has been completed, for scheduled task T2, the entire scheduled task has been completed, for scheduled task T3, a portion of the scheduled task with a duration of 0.5 days has been completed, and for filler task F1.1, the entire portion has been completed. Thus, scheduled task T1 has been completed 1.5 days behind schedule, scheduled task T2 has been completed according to schedule, scheduled task T3 has been started 1.5 days behind schedule, and filler task F1.1 has been completed according to schedule. As illustrated in project plan 205 of FIG. 3, a dashed extension rectangle at the end of scheduled task T3 indicates a new expected finish date of Oct. 30, 2013 (mid-day), which is 1.5 days after a planned finish date of Oct. 28, 2013 (end-of-day).

As previously described and illustrated in project plan 205 of FIG. 3, Dona has completed filler task F1.1. Because Matt has finished scheduled task T1, Dona can begin scheduled task T3. Because Dona can begin scheduled task T3, Dona has exited, or is about to exit, an idle period. In response to Dona exiting (or being about to exit) an idle period, the automatic task assignment system automatically un-assigns filler task F1 from Dona. The automatic task assignment system also assigns scheduled task T3 to Dona. The automatic task assignment system further sends a message to Dona informing Dona of the filler task un-assignment, and the new assignment of scheduled task T3. Dona then begins work on scheduled task T3. Further, Matt has no assigned scheduled tasks, and, thus, Matt has entered (or is about to enter) a new idle period with an indefinite duration. In response to Matt entering (or being about to enter) an idle period, the automatic task assignment system detects a "start trigger" condition, and automatically assigns filler task F1 to Matt by converting filler task F1 to filler task F1.2 and by assigning filler task F1.2 to Matt. The automatic task assignment system further sends a message to Matt informing Matt of the filler task assignment. Thus, the automatic task assignment system displays filler task F1.2 within the timeline, and no longer displays filler task F1 within filler tasks region 251. Filler task F2, which is also displayed within filler tasks region 251, is unchanged from filler task F2 displayed within filler task region 241 of project plan 204.

Figure 4:
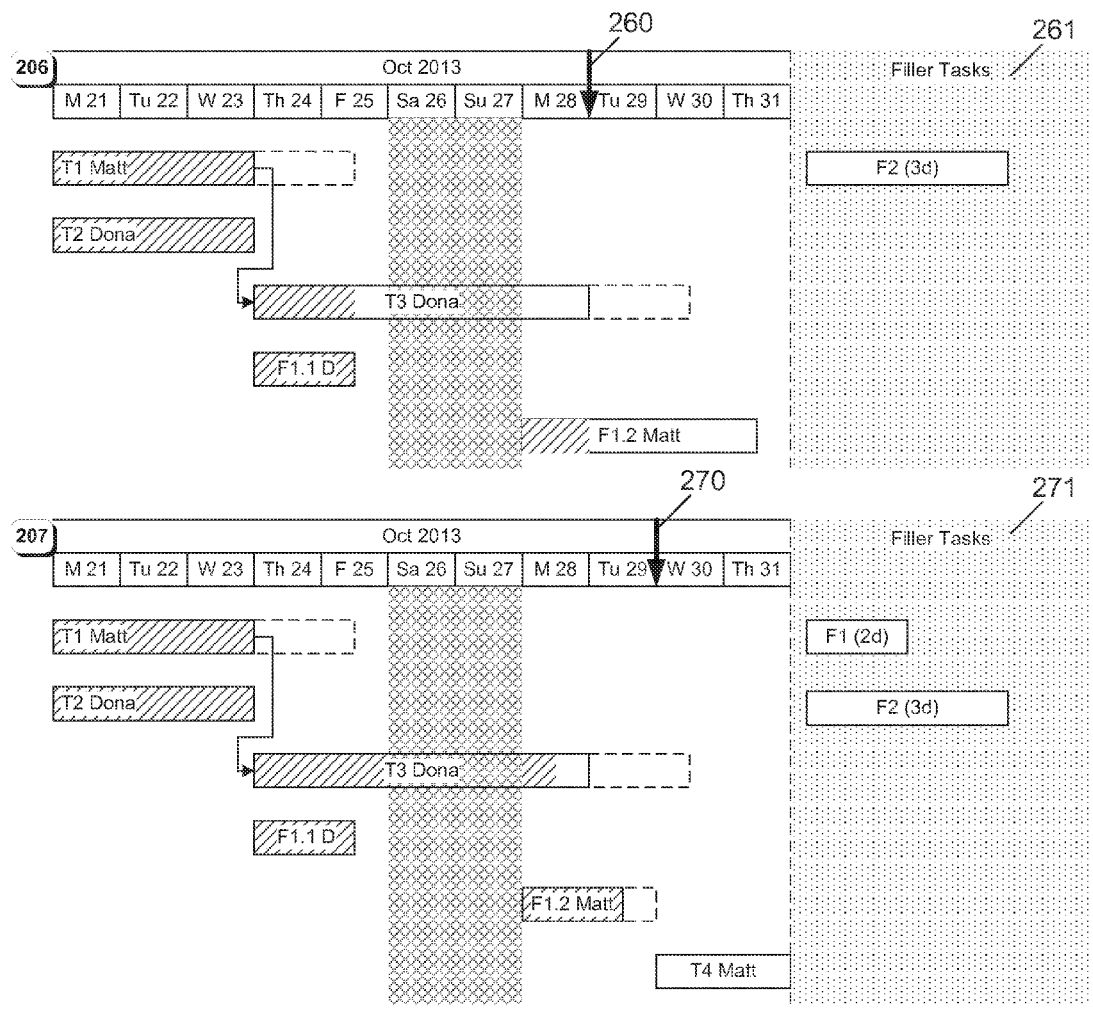
FIG. 4 illustrates a un-assignment of a filler task from a resource when a scheduled task is assigned, or about to be assigned, to the resource, according to an embodiment of the invention.

FIG. 4 illustrates a un-assignment of a filler task from a resource when a scheduled task is assigned, or about to be assigned, to the resource, according to another embodiment of the invention. More specifically, FIG. 4 illustrates a project plan 206 displayed by an automatic task assignment system. Within project plan 206, arrow 260 indicates an update received-by date of Oct. 28, 2013. For scheduled task T1, the entire scheduled task has been completed. For scheduled task T2, the entire scheduled task has been completed. For scheduled task T3, a portion of the scheduled task with a duration of 1.5 days has been completed. For filler task F1.1, the entire portion of the filler task has been completed. For filler task F1.2, a portion of the filler task with a duration of 1 day has been completed. Thus, scheduled task T1 has been completed 1.5 days behind schedule, scheduled task T2 has been completed according to schedule, the completion of scheduled task T3 is 1.5 days behind schedule, filler task F1.1 has been completed according to schedule, and the completion of filler task F.1.2 is according to schedule. As illustrated in project plan 206 of FIG. 4, a dashed extension rectangle at the end of scheduled task T3 indicates an expected finish date of Oct. 30, 2013 (mid-day), which is 1.5 days after a planned finish date of Oct. 28, 2013 (end-of-day). Because Dona still has work to complete for scheduled task T3, and because Matt still have work to complete for filler task F1.2, the automatic task assignment system is not required to assign any filler tasks to Dona and Matt. Filler task F2, which is displayed within filler tasks region 261, is unchanged from filler task F2 displayed within filler task region 251 of project plan 205.

In addition, FIG. 4 illustrates project plan 207 displayed by the automatic task assignment system. As illustrated in project plan 207 of FIG. 4, Dona continues to work on scheduled task T3, completing an additional day's worth of work. Additionally, Matt continues to work on filler task F1.2, completing an additional 0.5 days' worth of work, with a delay of 0.5 days. However, as illustrated in project plan 207 of FIG. 4, Matt receives a scheduled task T4, which has a higher priority than filler task F1.

Further, within project plan 207, arrow 270 indicates an update received-by date of Oct. 29, 2013. For scheduled task T1, the entire scheduled task has been completed. For scheduled task T2, the entire scheduled task has been completed. For scheduled task T3, a portion of the scheduled task with a duration of 2.5 days has been completed. For filler task F1.1, the entire portion of the filler task has been completed. For filler task F1.2, a portion of the filler task with a duration of 1.5 days has been completed. Thus, scheduled task T1 has been completed 1.5 days behind schedule, scheduled task T2 has been completed according to schedule, the completion of scheduled task T3 is 1.5 days behind schedule, filler task F1.1 has been completed according to schedule, and the completion of filler task F.1.2 is 0.5 days behind schedule. As illustrated in project plan 207 of FIG. 4, a dashed extension rectangle at the end of scheduled task T3 indicates an expected finish date of Oct. 30, 2013 (mid-day), which is 1.5 days after a planned finish date of Oct. 28, 2013 (end-of-day). Further, as also illustrated in project plan 207 of FIG. 4, a dashed extension rectangle at the end of filler task F1.2 indicates that filler task F1.2 was delayed by 0.5 days.

As illustrated in project plan 207 of FIG. 4, Matt receives a scheduled task T4, which has a higher priority than filler task F1, where scheduled task T4 is scheduled to start on Oct. 30, 2013. Because Matt has a received a scheduled task, Matt has exited, or is about to exit, an idle period. In response to Matt exiting (or being about to exit) an idle period, the automatic task assignment system automatically un-assigns an unfinished portion of filler task F1.2 from Matt by converting the unfinished portion of filler task F1.2, with a duration of 2 days, to filler task F1 and defining filler task F1 as an available filler task. The automatic task assignment system also assigns scheduled task T4 to Matt. The automatic task assignment system further sends a message to Matt informing Matt of the filler task un-assignment, and the new assignment of scheduled task T4. Thus, the automatic task assignment system displays filler task F1 within filler tasks region 271. Filler task F2, which is also displayed within filler tasks region 271, is unchanged from filler task F2 displayed within filler task region 261 of project plan 206.

Figure 5:
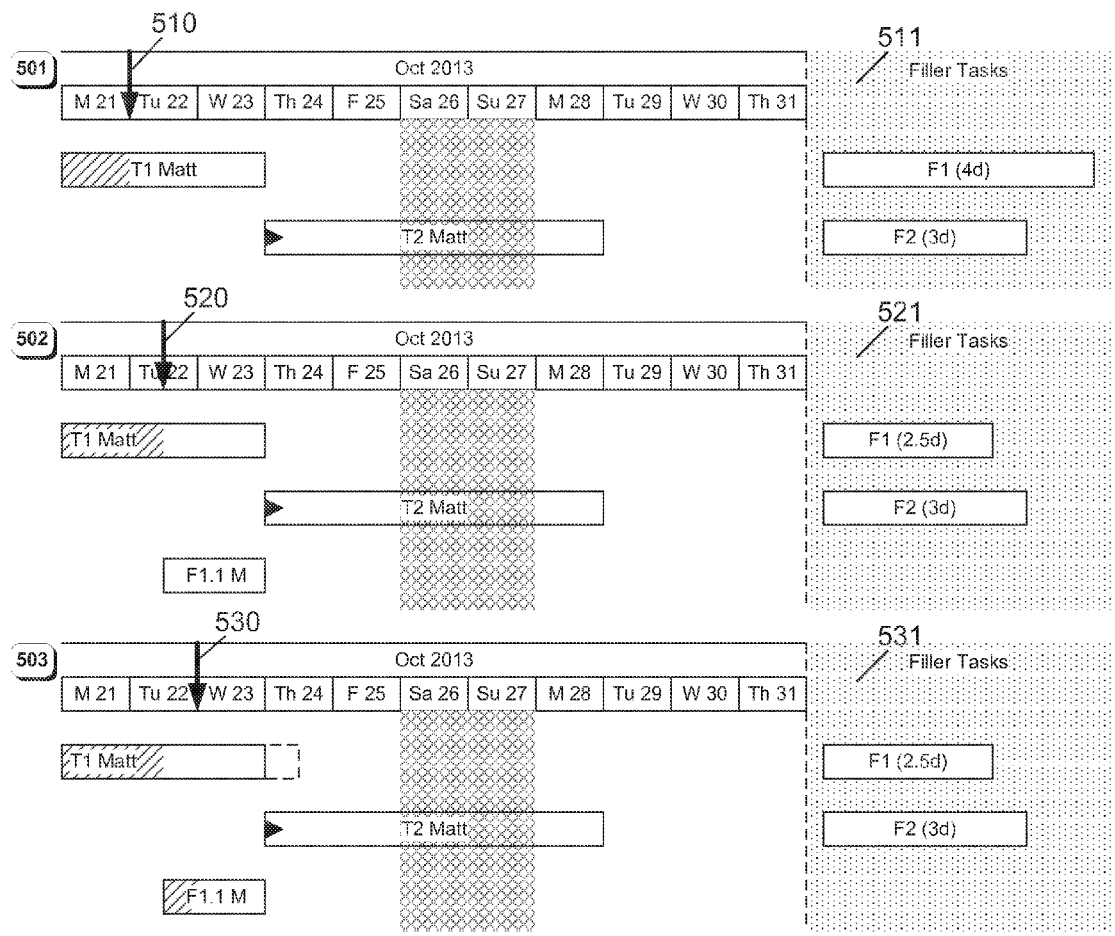
FIG. 5 illustrates an assignment of a filler task to a resource when a scheduled task is blocked due to an outside factor, according to an embodiment of the invention.

FIG. 5 illustrates an assignment of a filler task to a resource when a scheduled task is blocked due to an outside factor, according to an embodiment of the invention. More specifically, FIG. 5 illustrates a project plan 501 displayed by an automatic task assignment system, such as system 10 of FIG. 1. Project plan 501 includes scheduled tasks T1 and T2, which are displayed within a timeline, where scheduled tasks T1 and T2 are both assigned to resource Matt. Scheduled task T2 has a start-on-or-after date constraint (illustrated in project plan 501 of FIG. 5 by a right-pointing triangle on the left edge of scheduled task T2), where scheduled task T2 can only be started on or after Oct. 24, 2013.

Arrow 510 indicates an update received-by date of Oct. 21, 2013, where the notification complete-by date indicates a date by which all progress updates, or notifications, have been received by the automatic task assignment system. In other words, all progress updates, or notifications, sent on dates up to and including Oct. 21, 2013 have been received by the automatic task assignment system. The hatched portions of scheduled task T1 indicates a completed portion of scheduled task T1 as of Oct. 21, 2013. Thus, for scheduled task T1, a portion of the scheduled task with a duration of 1 day has been completed. In other words, the completion of scheduled task T1 is according to schedule. Project plan 501 further includes filler tasks F1 and F2, where filler tasks F1 and F2 are displayed within a filler task region 511. Filler task F1 has a duration of 4 days, and filler task F2 has a duration of 3 days. Further, filler task F1 has a higher priority than filler task F2, and thus, filler task F1 is displayed above filler task F2 within filler task region 511.

Further, FIG. 5 illustrates project plan 502 displayed by the automatic task assignment system. As illustrated in project plan 502 of FIG. 5, Matt works on scheduled task T1 for 0.5 days and then reports that scheduled task T1 has become blocked due to an outside factor (such as a machine used to perform the task breaking down). In response, the automatic task assignment system assigns filler task F1 to Matt. The automatic task assignment system cannot assign scheduled task T2 to Matt because it is only Oct. 22, 2013, and scheduled task T2 cannot be started until Oct. 24, 2013 or after.

Further, within project plan 502, arrow 520 indicates a notification complete-by date of Oct. 22, 2013 (mid-day). For scheduled task T1, a portion of the scheduled task with a duration of 1.5 days has been completed, and for filler task F1.1, a portion of the filler task with a duration of 0.5 days has been completed.

As previously described and illustrated in project plan 502 of FIG. 5, while Matt works on scheduled task T1 for 1.5 days, Matt cannot continue to work on scheduled task T1 because scheduled task T1 becomes blocked due to an outside factor (such as a machine used to perform the task breaking down). Thus, scheduled task T1 is blocked due to an outside factor, and Matt has entered (or is about to enter) an idle period with a duration of 1.5 days. In response to Matt entering (or being about to enter) an idle period, the automatic task assignment system splits filler task F1 into filler task F1.1 with a duration of 1.5 days and filler task F1 with a duration of 2.5 days, and automatically assigns filler task F1.1 to Matt. The automatic task assignment system further sends a message to Matt informing Matt of the filler task assignment. Thus, the automatic task assignment system displays filler task F1.1 within the timeline, and displays filler task F1 within filler tasks region 521. Filler task F2, which is also displayed within filler tasks region 521, is unchanged from filler task F2 displayed within filler task region 511 of project plan 501.

In addition, FIG. 5 illustrates project plan 503 displayed by the automatic task assignment system. As illustrated in project plan 503, Matt works on filler task F1.1 for 0.5 days. Within project plan 503, arrow 530 indicates an update received-by date of Oct. 22, 2013. For scheduled task T1, a portion of the scheduled task with a duration of 1.5 days has been completed, and for filler task F1.1, a portion of the filler task with a duration of 0.5 days has been completed. Thus, the completion of scheduled task T1 is 0.5 days behind schedule, and the completion of filler task F.1.1 is according to schedule. As illustrated in project plan 503 of FIG. 5, a dashed extension rectangle at the end of scheduled task T1 indicates an expected finish date of Oct. 24, 2013 (mid-day), which is 0.5 days after a planned finish date of Oct. 23, 2013 (end-of-day), under an assumption that scheduled task T1 is unblocked right away. However, one of ordinary skill in the art would readily appreciate that, if scheduled task T1 is not unblocked right away, a finish date of scheduled task T1 will be further delayed accordingly. Filler tasks F1 and F2, which are displayed within filler tasks region 531, are unchanged from filler tasks F1 and F2 displayed within filler task region 521 of project plan 502.

Figure 6:
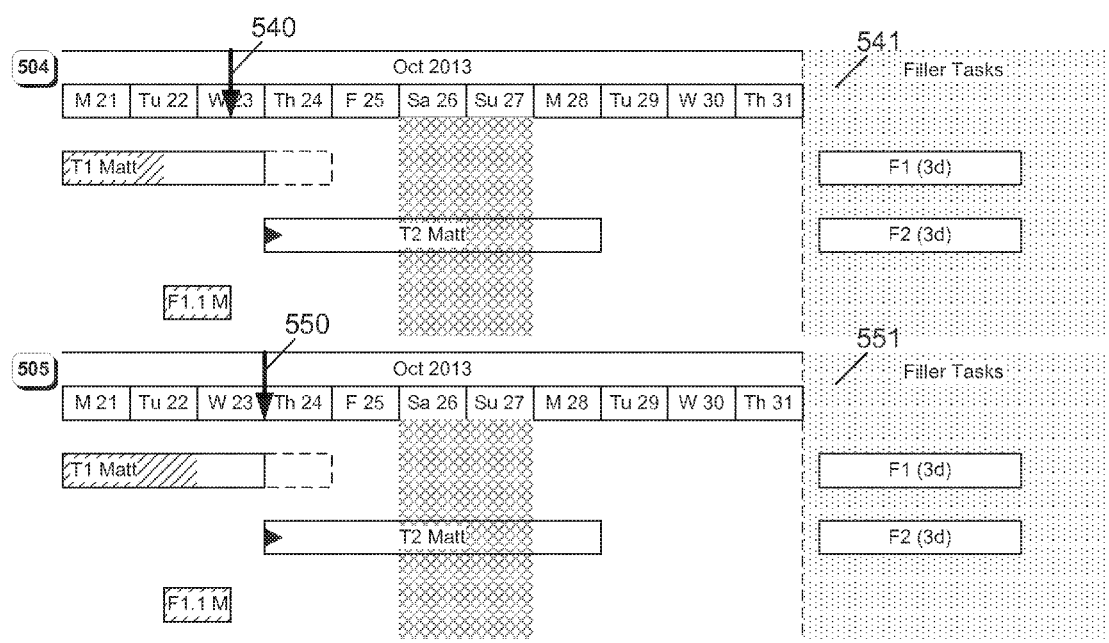
FIG. 6 illustrates a un-assignment of a filler task from a resource when a scheduled task is unblocked due to a removal or reversal an outside factor which blocked the scheduled task, according to an embodiment of the invention.

FIG. 6 illustrates a un-assignment of a filler task from a resource when a scheduled task is unblocked due to a removal or reversal of an outside factor which blocked the scheduled task, according to an embodiment of the invention. FIG. 6 illustrates project plan 504 displayed by the automatic task assignment system, such as system 10 of FIG. 1. As illustrated in project plan 504 of FIG. 6, Matt works on filler task F1.1 for 0.5 days and then reports that scheduled task T1 has become unblocked. In response, the automatic task assignment system us-assigns a remaining portion of filler task F1 from Matt and re-assigns scheduled task T1 back to Matt.

Further, within project plan 504, arrow 540 indicates an update received-by date of Oct. 23, 2013 (mid-day). For scheduled task T1, a portion of the scheduled task with a duration of 1.5 days has been completed, and for filler task F1.1, a portion of the filler task with a duration of 1 day has been completed. Thus, the completion of scheduled task T1 is 1 day behind schedule, and filler task F1.1 has been completed according to schedule. As illustrated in project plan 504 of FIG. 6, a dashed extension rectangle at the end of scheduled task T1 indicates an expected finish date of Oct. 24, 2013 (end-of-day), which is 1 day after a planned finish date of Oct. 23, 2013 (end-of-day).

As also illustrated in project plan 504 of FIG. 6, scheduled task T1 becomes unblocked. Because scheduled task T1 has become unblocked, Matt has exited, or is about to exit, an idle period. In response to Matt exiting (or being about to exit) an idle period, the automatic task assignment system automatically un-assigns filler task F1 from Matt by splitting off an unfinished portion of filler task F1.1, adding back the unfinished portion of filler task F1.1 to filler task F1 and defining filler task F1, with a duration of 3 days, as an available filler task. The automatic task assignment system also re-assigns scheduled task T1 back to Matt. The automatic task assignment system further sends a message to Matt informing Matt of the filler task un-assignment, and the re-assignment of scheduled task T1. Thus, the automatic task assignment system displays filler task F1 within filler tasks region 541. Filler task F2, which is also displayed within filler tasks region 541, is unchanged from filler task F2 displayed within filler task region 531 of project plan 503.

Further, FIG. 6 illustrates project plan 505 displayed by the automatic task assignment system. As illustrated in project plan 505, Matt works on scheduled task T1 for 0.5 days after scheduled task T1 is re-assigned to Matt. Within project plan 505, arrow 550 indicates an update received-by date of Oct. 23, 2013. For scheduled task T1, a portion of the scheduled task with a total duration of 2 days has been completed, and for filler task F1.1, the filler task, with a portion of 1 day, has been completed. Thus, the completion of scheduled task T1 is 1 day behind schedule, and the completion of filler task F.1.1 is according to schedule. Filler tasks F1 and F2, which are displayed within filler tasks region 551, are unchanged from filler tasks F1 and F2 displayed within filler task region 541 of project plan 504.

Figure 7:
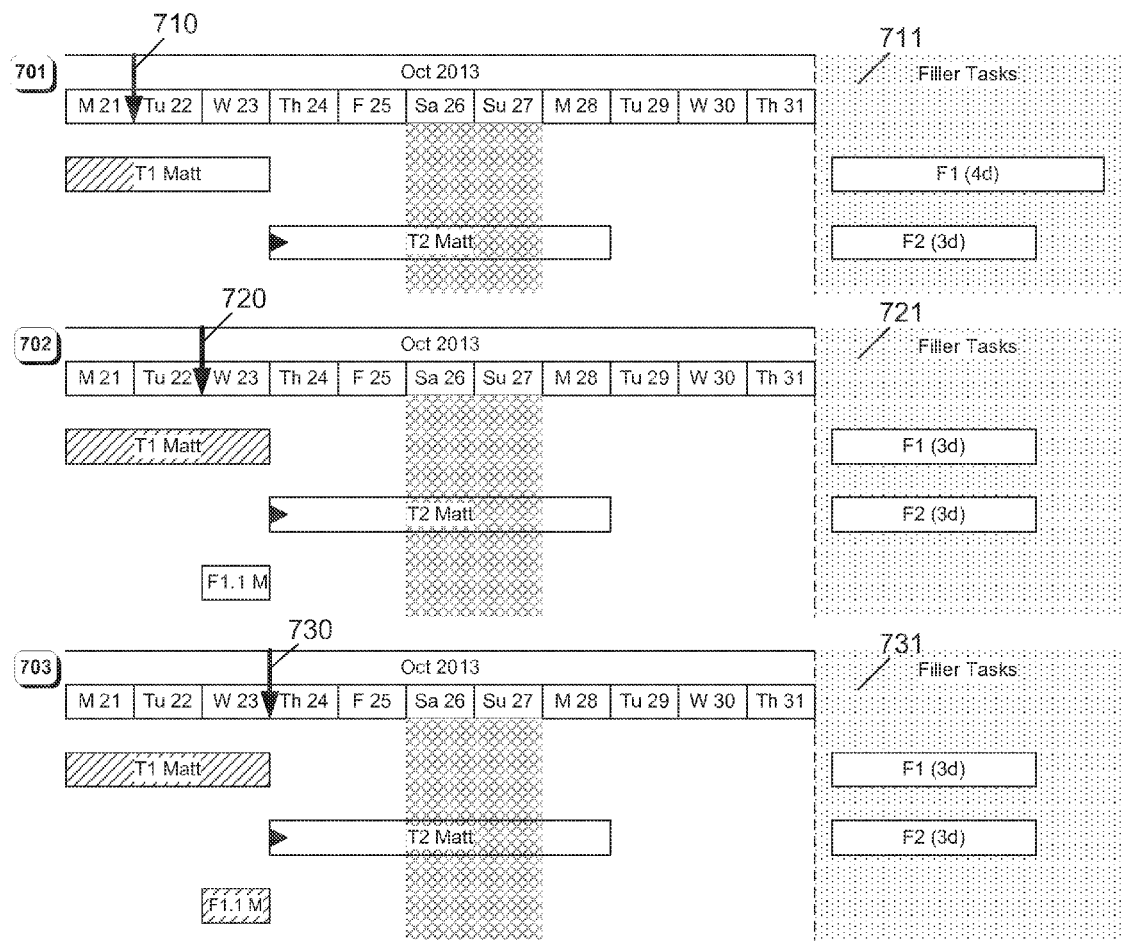
FIG. 7 illustrates an assignment of a filler task to a resource when a scheduled task is completed early, according to an embodiment of the invention.

FIG. 7 illustrates an assignment of a filler task to a resource when a scheduled task is completed early, according to an embodiment of the invention. More specifically, FIG. 7 illustrates a project plan 701 displayed by an automatic task assignment system, such as system 10 of FIG. 1. Project plan 701 includes scheduled tasks T1 and T2, which are displayed within a timeline, where scheduled tasks T1 and T2 are both assigned to resource Matt. Scheduled task T2 has a start-on-or-after date constraint (illustrated in project plan 701 of FIG. 7 by a right-pointing triangle on the left edge of scheduled task T2), where scheduled task T2 can only be started on or after Oct. 24, 2013.

Arrow 710 indicates an update received-by date of Oct. 21, 2013, where the update received-by date indicates a date by which all progress updates, or notifications, have been received by the automatic task assignment system. In other words, all progress updates, or notifications, for dates up to and including Oct. 21, 2013 have been received by the automatic task assignment system. The hatched portions of scheduled task T1 indicates a completed portion of scheduled task T1 as of Oct. 21, 2013. Thus, for scheduled task T1, a portion of the scheduled task with a duration of 1 day has been completed. In other words, the completion of scheduled task T1 is according to schedule. Project plan 701 further includes filler tasks F1 and F2, where filler tasks F1 and F2 are displayed within a filler task region 711. Filler task F1 has a duration of 4 days, and filler task F2 has a duration of 3 days. Further, filler task F1 has a higher priority than filler task F2, and thus, filler task F1 is displayed above filler task F2 within filler task region 711.

Further, FIG. 7 illustrates project plan 702 displayed by the automatic task assignment system. As illustrated in project plan 702 of FIG. 7, Matt completes scheduled task T1 a day early, and reports this fact to the automatic task assignment system. In response, the automatic task assignment system assigns filler task F1 to Matt. The automatic task assignment system cannot assign scheduled task T2 to Matt because it is only Oct. 22, 2013, and scheduled task T2 cannot be started only on or after Oct. 24, 2013.

Further, within project plan 702, arrow 720 indicates an update received-by date of Oct. 22, 2013. For scheduled task T1, a portion of the scheduled task with a duration of 3 days has been completed. Thus, the completion of scheduled task T1 is 1 day ahead of schedule.

As illustrated in project plan 702 of FIG. 7, Matt completed scheduled task T1 1 day ahead of schedule. Because Matt cannot start scheduled task T2 until Oct. 24, 2013, Matt has entered (or is about to enter) an idle period with a duration of 1 day. In response to Matt entering (or being about to enter) an idle period, the automatic task assignment system splits filler task F1 into filler task F1.1 with a duration of 1 day and filler task F1 with a duration of 3 days, and automatically assigns filler task F1.1 to Matt. The automatic task assignment system further sends a message to Matt informing Matt of the filler task assignment. Thus, the automatic task assignment system displays filler task F1.1 within the timeline, and displays filler task F1 within filler tasks region 721. Filler task F2, which is also displayed within filler tasks region 721, is unchanged from filler task F2 displayed within filler task region 711 of project plan 701.

In addition, FIG. 7 illustrates project plan 703 displayed by the automatic task assignment system. As illustrated in project plan 703 of FIG. 7, Matt works on filler task F1.1 for 1 day, and reports that Matt has completed filler task F1.1. By the end of the day, Matt is able to start on scheduled task T2, since the next day is Oct. 24, 2013. Thus, in response, the automatic task assignment system informs Matt that Matt should proceed to start scheduled task T2 on Oct. 24, 2013.

Further, within project plan 703, arrow 730 indicates an update received-by date of Oct. 23, 2013. For scheduled task T1, a portion of the scheduled task with a duration of 3 days has been completed, and for filler task F1.1, the entire portion of the filler task has been completed. Thus, scheduled task T1 has been completed 1 day ahead of schedule, and filler task F1.1 has been completed according to schedule.

As also illustrated in project plan 703 of FIG. 7, scheduled task T2 can be started. Because scheduled task T2 can be started, Matt has exited, or is about to exit, an idle period. In response to Matt exiting (or being about to exit) an idle period, the automatic task assignment system automatically sends a message to Matt informing Matt of the next scheduled task, scheduled task T2. Thus, the automatic task assignment system displays filler task F1 within filler tasks region 731, which is unchanged from filler task F1 within filler task region 721 of project plan 702. Filler task F2, which is also displayed within filler tasks region 731, is also unchanged from filler task F2 displayed within filler task region 721 of project plan 702.

Figure 8:
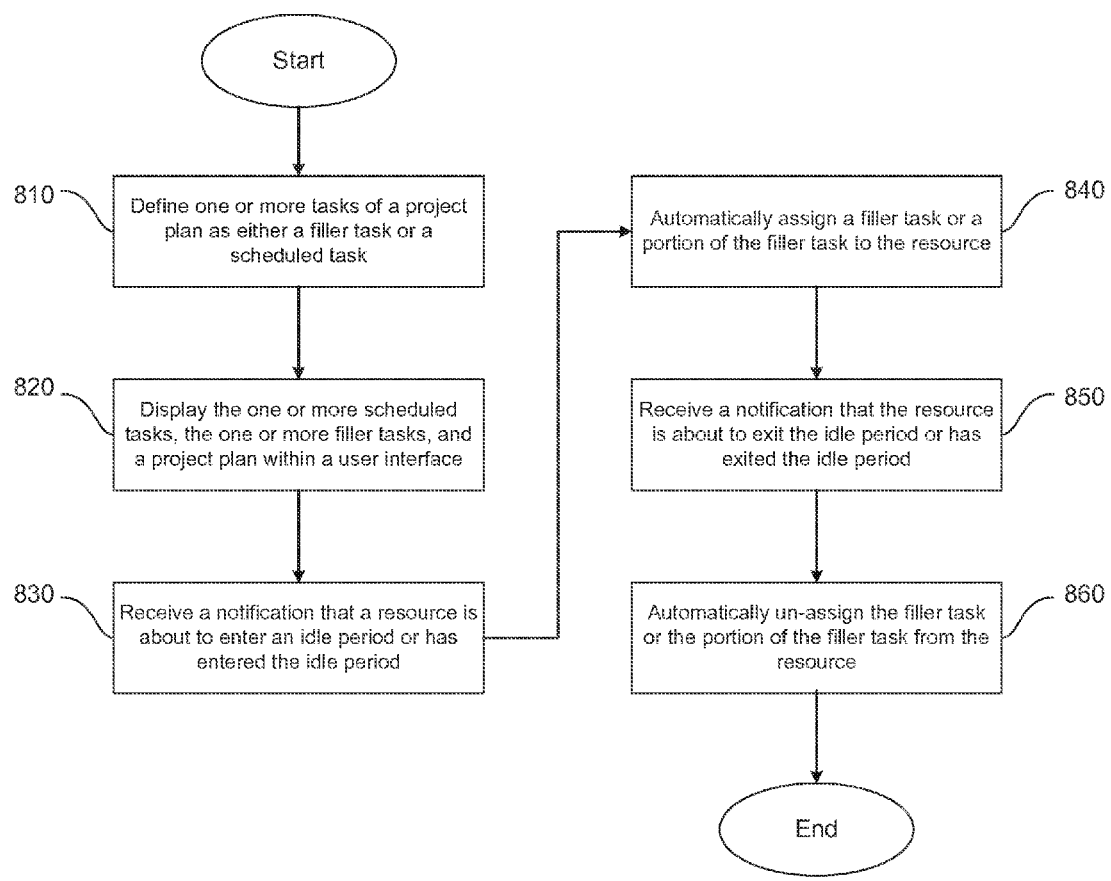
FIG. 8 illustrates a flow diagram of the functionality of an automatic task assignment module, according to an embodiment of the invention.

FIG. 8 illustrates a flow diagram of the functionality of an automatic task assignment module (such as automatic task assignment module 16 of FIG. 1), according to an embodiment of the invention. In one embodiment, the functionality of the flow diagram of FIG. 8 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 810. At 810, one or more tasks of a project plan are defined as either a filler task or a scheduled task. A filler task is a task that can be split into multiple portions, and a scheduled task is a task that is scheduled for a date and/or time. In certain embodiments, in defining one or more tasks of the project plan, one or more tasks are first identified as suggested filler tasks. Next, for each suggested filler task, an indication is received, where the indication is either that the suggested filler task has been accepted as a filler task or that the suggested filler task has been rejected as a filler task. Subsequently, for each suggested filler task where an indication that the suggested filler task has been accepted as a filler task is received, the suggested filler task is defined as a filler task. All other tasks can be defined as scheduled tasks. Further, in some of these embodiments, in identifying one or more tasks as suggested filler tasks, for each task, it can be determined: (1) whether the task can be split into multiple portions; (2) whether the task has a priority that is less than a priority threshold; (3) whether the task has a time-flexibility that is greater than a time-flexibility threshold; or (4) any combination of (1), (2), and (3). In some of these embodiments, the priority threshold or the time-flexibility threshold (or both thresholds) can be configured by a user. The flow then proceeds to 820.

At 820, the one or more scheduled tasks, the one or more filler tasks, and a project plan are displayed within a user interface. The one or more filler tasks are displayed separately from the one or more scheduled tasks. In certain embodiments, the one or more scheduled tasks and a timeline are displayed within a first region of the project plan, where each scheduled task is displayed at a position within the timeline that corresponds to a scheduled date and/or time of the scheduled task. Further, in these embodiments, the one or more filler tasks are displayed within a second region of the project plan, wherein each filler task is displayed at a position within the second region that corresponds to a priority of the filler task. The flow then proceeds to 830.

At 830, an update, or notification, that a resource is about to enter an idle period or has entered the idle period is received. The idle period is a period where no scheduled tasks are assigned to the resource. In certain embodiments, a start-trigger condition is detected, and a notification event is triggered in response to the detection of the start-trigger condition, when the notification event is eventually received. In some of these embodiments, the start-trigger condition can be at least one of: (1) a current scheduled task assigned to the resource becoming blocked; (2) a successor scheduled task assigned to the resource becoming blocked when the resource is about to complete or has completed the current scheduled task; (3) the resource completing the current scheduled task earlier than scheduled and being unable to start the successor scheduled task; or (4) the resource entering a planned idle period where no scheduled tasks are assigned to the resource. The flow then proceeds to 840.

At 840, a filler task or a portion of the filler task is automatically assigned to the resource. In certain embodiments, the filler task is first selected from one or more filler tasks. In some of these embodiments, the filler task can be selected based on at least one of: (1) a priority of the selected filler task; (2) a dependency or constraint of the selected filler task; (3) a parallelism level of the selected filler task; (4) a minimum split duration of the selected filler task; or (5) a skill matching requirement of the filler task. Once the filler task has been selected, a duration of the idle period is determined. It is then determined whether a duration of the filler task is less than, greater than, or equal to the duration of the idle period. When the duration of the filler task is less than or equal to the duration of the idle period, the filler task (i.e., the total filler task) is assigned to the resource. When the duration of the filler task is greater than the duration of the idle period, the filler task is divided into a first portion and a second portion, where a duration of the first portion is equal to the duration of the idle period, and the first portion is assigned to the resource. The flow then proceeds to 850.

At 850, an update, or notification, that a resource is about to exit the idle period or has exited the idle period is received. In certain embodiments, a stop-trigger condition is detected, and a notification event is triggered in response to the detection of the stop-trigger condition, when the notification event is eventually received. In some of these embodiments, the stop-trigger condition can be at least one of: (1) a current scheduled task assigned to the resource that was previously blocked becoming unblocked; (2) a successor scheduled task assigned to the resource that is blocked becoming unblocked when the resource has completed the current scheduled task; or (3) an earliest start date and/or time for the successor scheduled task being reached. The flow then proceeds to 860.

At 860, the filler task or the portion of the filler task is automatically un-assigned from the resource. In certain embodiments, it is first identified whether the resource completed the filler task or the portion of the filler task. When the resource has not completed the filler task or the portion of the filler task, an unfinished portion of the filler task is defined as an available filler task. The flow then ends.

Thus, an automatic task assignment system is provided that can automatically assign filler tasks to resources that have become idle or are about to become idle. In any complex project, there are several tasks that are either getting delayed or getting finished early almost on a daily basis. It can be overwhelming for project managers to monitor all of these tasks, and manually taking corrective action for each task that is either delayed or finished early. Rather than requiring projects managers to manually take corrective actions, the automatic task assignment can allow a project manager to simply define some tasks as filler tasks, and can further automatically assign filler tasks to resources that have become idle or are about to become idle, without further interaction from the project manager. This can allow the project manager to focus on more value-added work.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to automatically assign tasks to resources, the automatic assigning comprising:
   receiving a notification that a resource is about to enter an idle period or has entered the idle period;
   automatically assigning a filler task or a portion of the filler task to the resource, wherein the filler task or the portion of the filler task comprises a task that can be split into multiple portions, wherein when the duration of the filler task is greater than a duration of the idle period the assigning comprises:
      dividing the filler task into the portion of the filler task and another portion of the filler task, wherein a duration of the portion of the filler task is equal to the duration of the idle period; and
      assigning the portion of the filler task to the resource;
   receiving a notification that the resource is about to exit the idle period or has exited the idle period; and
   automatically un-assigning the filler task or the portion of the filler task from the resource.

2. The non-transitory computer-readable medium of claim 1, the automatic assigning comprising:
   defining one or more tasks of a project plan as either a filler task or a scheduled task, wherein a scheduled task comprises a task that is scheduled for a date and/or time; and
   displaying the one or more scheduled tasks, the one or more filler tasks and the project plan within a user interface, wherein the one or more filler tasks are displayed separately from the one or more scheduled tasks.

3. The non-transitory computer-readable medium of claim 2, wherein the defining one or more tasks further comprises:
   identifying one or more tasks as suggested filler tasks;
   for each suggested filler task, receiving an indication either that the suggested filler task has been accepted as a filler task or that the suggested filler task has been rejected as a filler task; and
   for each suggested filler task where an indication that the suggested filler task has been accepted as a filler task is received, defining the suggested filler task as a filler task.

4. The non-transitory computer-readable medium of claim 3, wherein the identifying one or more tasks as suggested filler tasks further comprises:
   for each task, determining at least one of: whether the task can be split into multiple portions; whether the task has a priority that is less than a priority threshold; or whether the task has a time-flexibility that is greater than a time-flexibility threshold.

5. The non-transitory computer-readable medium of claim 4, wherein at least one of the priority threshold or the time-flexibility threshold can be configured by a user.

6. The non-transitory computer-readable medium of claim 2, wherein the displaying the one or more scheduled tasks, the one or more filler tasks and the project plan within a user interface further comprises:
   displaying the one or more scheduled tasks and a timeline within a first region of the project plan, wherein each scheduled task is displayed at a position within the timeline that corresponds to a scheduled date and/or time of the scheduled task; and
   displaying the one or more filler tasks within a second region of the project plan, wherein each filler task is displayed at a position within the second region that corresponds to a priority of the filler task.

7. The non-transitory computer-readable medium of claim 1, wherein the receiving the notification that the resource is about to enter the idle period or has entered the idle period further comprises:
   detecting a start-trigger condition;
   wherein the start-trigger condition comprises at least one of: a current scheduled task assigned to the resource becoming blocked; a successor scheduled task assigned to the resource becoming blocked when the resource is about to complete or has completed the current scheduled task; the resource completing the current scheduled task earlier than scheduled and being unable to start the successor scheduled task; or the resource entering a planned idle period where no scheduled tasks are assigned to the resource; and
   triggering a notification event in response to the detection of the start-trigger condition.

8. The non-transitory computer-readable medium of claim 1, wherein the automatically assigning the filler task or the portion of the filler task to the resource further comprises:
   selecting the filler task from one or more filler tasks, wherein the selected filler task is selected based on at least one of: a priority of the selected filler task; a dependency or constraint of the selected filler task; a parallelism level of the selected filler task; a minimum split duration of the selected filler task; or a skill matching requirement of the filler task;
   identifying the duration of the idle period; and
   assigning the filler task to the resource when the duration of the filler task is less than or equal to the duration of the idle period.

9. The non-transitory computer-readable medium of claim 1, wherein the receiving the notification that the resource is no longer idle further comprises:
   detecting a stop-trigger condition;
   wherein the stop-trigger condition comprises at least one of: a current scheduled task assigned to the resource that is blocked becoming unblocked; a successor scheduled task assigned to the resource that is blocked becoming unblocked when the resource has completed the current scheduled task; or a start date and/or time for the successor scheduled task being reached; and
   triggering a notification event in response to the detection of the stop-trigger condition.

10. The non-transitory computer-readable medium of claim 1, the automatically un-assigning the filler task or the portion of the filler task from the resource further comprises:
    identifying whether the resource completed the filler task or the portion of the filler task; and
    defining an unfinished portion of the filler task as an available filler task.

11. The non-transitory computer-readable medium of claim 1, wherein the idle period comprises a period where no scheduled tasks are assigned to the resource.

12. A computer-implemented method for automatically assigning tasks to resources, the computer-implemented method comprising:
    receiving, by a computer processor, a notification that a resource is about to enter an idle period or has entered the idle period;
    automatically assigning, by the computer processor, a filler task or a portion of the filler task to the resource, wherein the filler task or the portion of the filler task comprises a task that can be split into multiple portions, wherein the assigning comprises:
       dividing the filler task into the portion of the filler task and another portion of the filler task when the duration of the filler task is greater than a duration of the idle period, wherein a duration of the portion of the filler task is equal to the duration of the idle period; and assigning the portion of the filler task to the resource when the duration of the filler task is greater than the duration of the idle period;

receiving a notification that the resource is about to exit the idle period or has exited the idle period; and automatically un-assigning the filler task or the portion of the filler task from the resource.

13. The computer-implemented method of claim 12, wherein the receiving the notification that the resource is about to enter the idle period or has entered the idle period further comprises:

detecting a start-trigger condition;

wherein the start-trigger condition comprises at least one of: a current scheduled task assigned to the resource becoming blocked; a successor scheduled task assigned to the resource becoming blocked when the resource is about to complete or has completed the current scheduled task; the resource completing the current scheduled task earlier than scheduled and being unable to start the successor scheduled task; or the resource entering a planned idle period where no scheduled tasks are assigned to the resource; and triggering a notification event in response to the detection of the start-trigger condition.

14. The computer-implemented method of claim 12, wherein the automatically assigning the filler task or the portion of the filler task to the resource further comprises:

selecting the filler task from one or more filler tasks, wherein the selected filler task is selected based on at least one of: a priority of the selected filler task; a dependency or constraint of the selected filler task; a parallelism level of the selected filler task; a minimum split duration of the selected filler task; or a skill matching requirement of the filler task;

identifying the duration of the idle period; and assigning the filler task to the resource when the duration of the filler task is less than or equal to the duration of the idle period.

15. The computer-implemented method of claim 12, wherein the receiving the notification that the resource is no longer idle further comprises:

detecting a stop-trigger condition;

wherein the stop-trigger condition comprises at least one of: a current scheduled task assigned to the resource that is blocked becoming unblocked; a successor scheduled task assigned to the resource that is blocked becoming unblocked when the resource has completed the current scheduled task; or a start date and/or time for the successor scheduled task being reached; and triggering a notification event in response to the detection of the stop-trigger condition.

16. The computer-implemented method of claim 12, the automatically un-assigning the filler task or the portion of the filler task from the resource further comprises:

identifying whether the resource completed the filler task or the portion of the filler task; and defining an unfinished portion of the filler task as an available filler task.

17. A system for automatically assigning tasks to resources, the system comprising:

a processor configured to execute a collection of software modules, wherein the processor is further configured, when executing the collection of software modules, to:

receive a notification that a resource is about to enter an idle period or has entered the idle period; and automatically assign a filler task or a portion of the filler task to the resource, wherein the filler task or the portion of the filler task comprises a task that can be split into multiple portions:

divide the filler task into the portion of the filler task and another portion of the filler task when the duration of the filler task is greater than a duration of the idle period, wherein a duration of the portion of the filler task is equal to the duration of the idle period; and assign the portion of the filler task to the resource when the duration of the filler task is greater than the duration of the idle period;

receive a notification that the resource is about to exit the idle period or has exited the idle period; and automatically un-assign the filler task or the portion of the filler task from the resource.

18. The system of claim 17, further comprising detecting a start-trigger condition;

wherein the start-trigger condition comprises at least one of: a current scheduled task assigned to the resource becoming blocked; a successor scheduled task assigned to the resource becoming blocked when the resource is about to complete or has completed the current scheduled task; the resource completing the current scheduled task earlier than scheduled and being unable to start the successor scheduled task; or the resource entering a planned idle period where no scheduled tasks are assigned to the resource; and triggering a notification event in response to the detection of the start-trigger condition.

19. The system of claim 17, further comprising selecting the filler task from one or more filler tasks, wherein the selected filler task is selected based on at least one of: a priority of the selected filler task; a dependency or constraint of the selected filler task; a parallelism level of the selected filler task; a minimum split duration of the selected filler task; or a skill matching requirement of the filler task;

identifying the duration of the idle period; and assigning the filler task to the resource when the duration of the filler task is less than or equal to the duration of the idle period.

20. The system of claim 17, further comprising detecting a stop-trigger condition;

wherein the stop-trigger condition comprises at least one of: a current scheduled task assigned to the resource that is blocked becoming unblocked; a successor scheduled task assigned to the resource that is blocked becoming unblocked when the resource has completed the current scheduled task; or a start date and/or time for the successor scheduled task being reached; and triggering a notification event in response to the detection of the stop-trigger condition.

* * * * *